(12) United States Patent
Yueksel

(10) Patent No.: US 10,766,341 B2
(45) Date of Patent: Sep. 8, 2020

(54) VENTILATING DUCT FOR A VENTILATION DEVICE OF A MOTOR VEHICLE

(71) Applicant: Dr. Ing. h.c. F. Porsche Aktiengesellschaft, Stuttgart (DE)

(72) Inventor: Tolga Yueksel, Esslingen (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 124 days.

(21) Appl. No.: 15/964,088

(22) Filed: Apr. 27, 2018

(65) Prior Publication Data

US 2019/0009650 A1 Jan. 10, 2019

(30) Foreign Application Priority Data

Jul. 5, 2017 (DE) .......................... 10 2017 115 012

(51) Int. Cl.
*B60H 1/34* (2006.01)
(52) U.S. Cl.
CPC ......... *B60H 1/3414* (2013.01); *B60H 1/3421* (2013.01); *B60H 2001/3471* (2013.01)
(58) Field of Classification Search
CPC .. B60H 1/3414; B60H 1/3442; B60H 1/3457; B60H 1/3478; B60H 1/3407; B60H 1/34; B60H 1/00678; B60H 1/00685; B60H 1/0065; B60H 1/00671
USPC ....................................................... 454/115
See application file for complete search history.

(56) References Cited

U.S. PATENT DOCUMENTS

| 1,592,471 A * | 7/1926 | Smolensky | F16K 3/085 137/625.31 |
| 3,688,477 A * | 9/1972 | Coward, Jr. | F24F 3/1603 55/418 |
| 2010/0163633 A1* | 7/2010 | Barrett | F24F 13/082 236/49.3 |

FOREIGN PATENT DOCUMENTS

| DE | 102004003059 B4 | 10/2010 |
| DE | 202011000453 U1 | 5/2011 |
| DE | 102012213513 A1 | 2/2014 |
| DE | 102013213277 A1 | 1/2015 |
| DE | 102015206621 A1 | 10/2016 |
| EP | 1332900 B1 | 1/2006 |

(Continued)

OTHER PUBLICATIONS

Schneider Kunststoffwerke Gmbh, DE202011000453 Translation. pdf, "Drosseleinrichtung für den Luftdurchsatz durch einen Lufteinlass", May 2011, pp. 1-11.*

*Primary Examiner* — Grant Boubry
*Assistant Examiner* — Ryan L Faulkner
(74) *Attorney, Agent, or Firm* — Leydig, Voit & Mayer Ltd.

(57) ABSTRACT

A ventilating duct for a ventilation device of a motor vehicle includes a housing through which a flow can pass, with a main duct and at least one flow-directing element mounted rotatably about an axis of rotation in the housing. The housing has a first housing portion and a second housing portion, and the first housing portion is designed facing an air conditioning system of the ventilation device and is configured to be connectable to the latter such that the flow can pass through. The second housing portion faces a passenger cell of the motor vehicle and is configured to be arranged with the passenger cell such that the flow can pass through. The main duct is divided in the second housing portion into at least two sub-ducts with the aid of a partition (Continued)

which is arranged downstream of the flow-directing element.

19 Claims, 3 Drawing Sheets

(56) References Cited

FOREIGN PATENT DOCUMENTS

FR 2792256 A1 10/2000
GB 1436838 A 5/1976

* cited by examiner

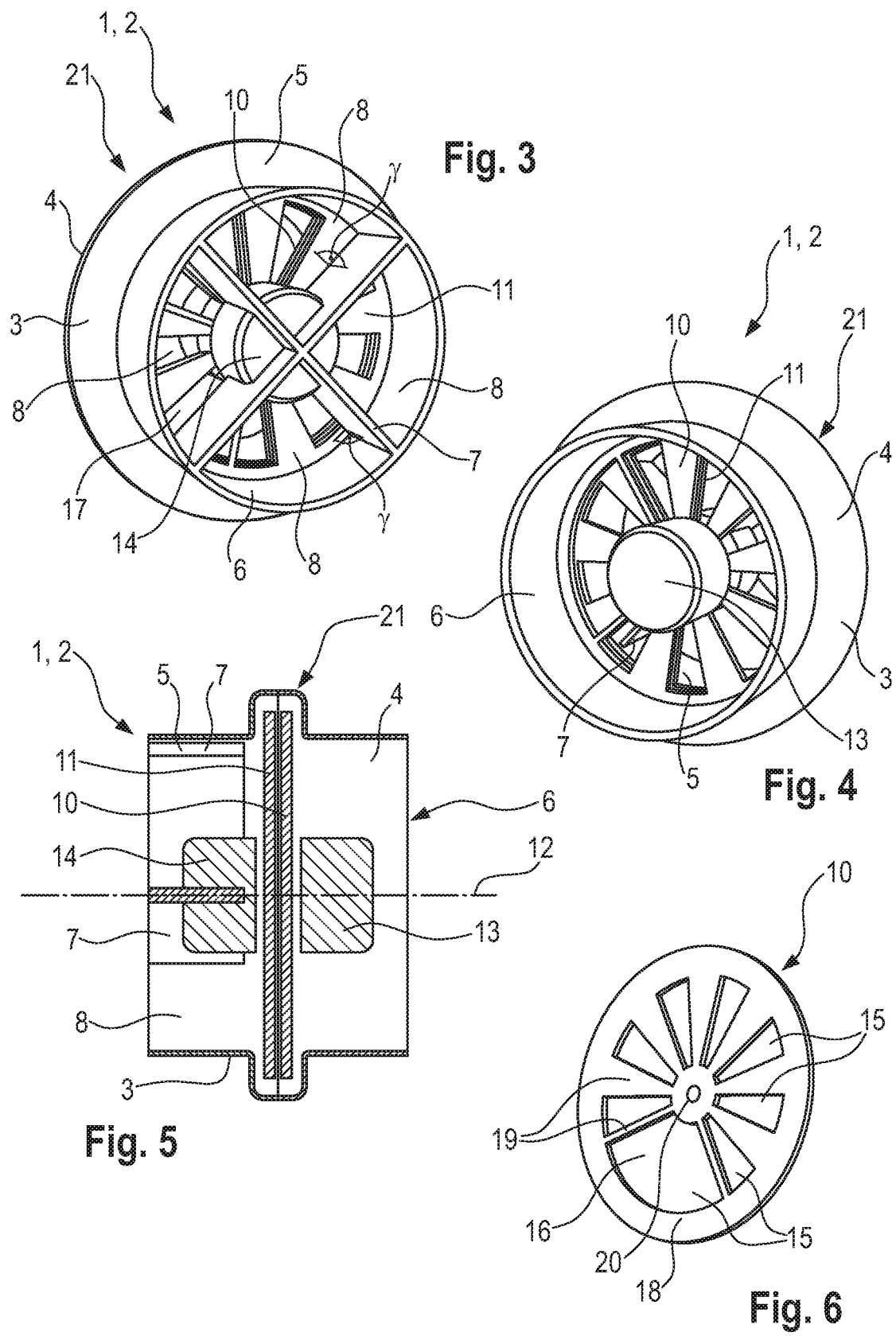

VENTILATING DUCT FOR A VENTILATION DEVICE OF A MOTOR VEHICLE

CROSS REFERENCE TO RELATED APPLICATIONS

This application claims benefit to German Patent Application No. DE 10 2017 115 012.9, filed Jul. 5, 2017, which is hereby incorporated by reference herein.

FIELD

The invention relates to a ventilating duct for a ventilation device of a motor vehicle, having a housing, with a main duct and a flow-directing element.

BACKGROUND

Ventilation devices for motor vehicles are known. They serve for bringing about an airflow in an interior of the motor vehicle and are of adjustable design. The adjustment firstly enables setting of the rate of the airflow and secondly the direction of flow of the airflow.

For adaptation of the airflow to meet requirements, the ventilation devices have ventilating ducts with perforated disks which are customarily installed in an interior component of a motor vehicle. The perforated disks are partially rotatable independently of one another about a longitudinal axis of the ventilating duct. The perforated disks are arranged axially along the longitudinal axis, and have openings through which the flow can pass. The openings can be completely or partially closed with the aid of the adjacent perforated disk.

Laid-open application DE 10 2015 206 621 A1 discloses a ventilating duct for a ventilation device which comprises a plurality of coaxially arranged perforated disks. The openings of the perforated disks are formed inclined in relation to a horizontal in such a manner that flow ducts in the manner of a spiral shape can be brought about.

Laid-open application DE 10 2013 213 277 A1 reveals a ventilating duct for a ventilation device which comprises a plurality of coaxially arranged perforated disks which are arranged rotatably relative to one another with the aid of an adjusting ring surrounding the perforated disks.

Laid-open application DE 10 2012 213 513 A1 discloses a ventilating duct for a ventilation device, comprising a plurality of coaxially arranged perforated disks which are rotatable relative to one another. The rotation takes place with the aid of an actuator which is arranged in the form of a disk and between the perforated disks, or is formed with a translationally movable drive element.

Laid-open specification DE 20 2011 000 453 U1 discloses a ventilating duct for a ventilation device which has two rotatably mounted perforated disks which are mounted coaxially with respect to each other and with respect to a fixed perforated disk. The two perforated disks are rotatable relative to the fixed perforated disk, wherein openings of the perforated disks and of the fixed perforated disk, through which openings the flow can pass, can be closed with the aid of the perforated disks.

Further ventilating ducts for ventilation devices comprising at least two perforated disks which are rotatable relative to one another can be gathered from the documents FR 2 792 256 B1, EP 1 332 900 B1, DE 10 2004 003 059 B4 and GB 1 436 838 A.

SUMMARY

In an embodiment, the present invention provides a ventilating duct for a ventilation device of a motor vehicle. The ventilating duct includes a housing through which a flow can pass, with a main duct and at least one flow-directing element mounted rotatably about an axis of rotation in the housing. The housing has a first housing portion and a second housing portion, and the first housing portion is designed facing an air conditioning system of the ventilation device and is configured to be connectable to the latter such that the flow can pass through. The second housing portion faces a passenger cell of the motor vehicle and is configured to be arranged with the passenger cell such that the flow can pass through. The main duct is divided in the second housing portion into at least two sub-ducts with the aid of a partition which is arranged downstream of the flow-directing element, wherein the partition in its direction of extent along a longitudinal axis of the ventilating duct is formed transversely relative to the flow-directing element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows, in a perspective view, the ventilating duct according to FIG. 1 with a view of an outlet of the ventilating duct;

FIG. 4 shows, in a perspective view, the ventilating duct according to FIG. 1 with a view of an inlet of the ventilating duct;

FIG. 5 shows, in a longitudinal section, the ventilating duct according to FIG. 1;

FIG. 6 shows, in a perspective view, a flow-directing element of the ventilating duct according to FIG. 1;

DETAILED DESCRIPTION

Figure 1:
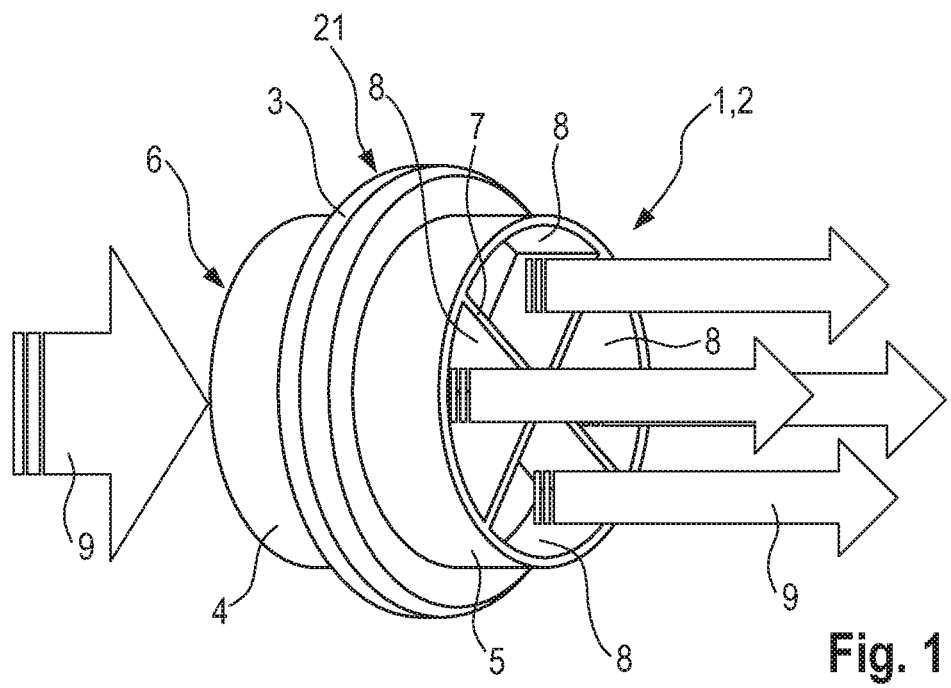
FIG. 1 shows, in a perspective view, a ventilating duct according to an embodiment of the invention for a ventilation device of a motor vehicle.

One or more embodiments of the present invention provide an improved ventilating duct for a ventilation device of a motor vehicle.

According to one or more embodiments of the invention, a ventilating duct for a ventilation device of a motor vehicle comprises a housing through which the flow can pass, with a main duct and at least one flow-directing element which is mounted rotatably about its axis of rotation in the housing. The housing has a first housing portion and a second housing portion, and wherein the first housing portion is designed facing an air conditioning system of the ventilation device and to be connectable to the latter such that the flow can pass through, and wherein the second housing portion faces a passenger cell of the motor vehicle and can be arranged with said passenger cell such that the flow can pass through. According to one or more embodiments of the invention, the main duct is divided in the second housing portion into at least two sub-ducts with the aid of a partition which is arranged downstream of the flow-directing element, wherein the partition in its direction of extent along a longitudinal axis of the ventilating duct is formed transversely relative to the flow-directing element. The advantage is bringing about flow conduction with the aid of directing elements formed transversely with respect to one another. In particular, it is possible, with the aid of the flow-directing element, to influence a volumetric flow with regard in particular to the speed thereof, and specifically to influence the direction of the volumetric flow with the aid of the partition arranged transversely with respect thereto. In order to reduce flow losses, the partition is preferably formed in particular at an angle of 90° relative to the flow-directing element.

In order to bring about increased variability of the direction of the airflow, the main duct is divided in the second housing portion into four sub-ducts. The sub-ducts are preferably formed symmetrically so that, depending on the flow-directing element, each sub-duct can be assigned a volumetric flow of the same size, as a result of which, with, for example, an alternating opening and closing of the sub-ducts, an improvement in how an occupant of the passenger cell experiences the incoming flow can be achieved.

The flow-directing element is advantageously arranged between the first housing portion and the second housing portion. The flow can pass through the housing, and therefore the flow can likewise pass through the two housing portions, and the latter each have, at their ends formed facing each other, a portion cross section through which the flow can pass. The flow-directing element can therefore be introduced into the portion cross section in a simple manner. Particularly advantageously, the housing portions have, at their ends formed facing each other, a flange which serves for axially limiting the flow-directing element. Consequently, cost-effective production of the ventilating duct can be realized since the flow-directing element can be inserted and mounted in a simple manner at one end of the housing portion.

To further increase the variability of the flow to be formed in the interior, a further flow-directing element is accommodated coaxially with the flow-directing element in the housing. With the aid of the further flow-directing element, the size of throughflow openings of the flow-directing element can be changed in such a manner that increased variability is formed not only in respect of an assignment of the flow to the sub-ducts, but also in respect of the passage of flow therethrough since the throughflow openings can be decreased in size or even closed, depending on the position of the two flow-directing elements.

In a further refinement of the invention, to further increase the variability of the flow, the flow elements are movable independently of one another.

To reduce flow losses, the further flow-directing element is positioned directly adjacent to the flow-directing element.

The flow-directing element advantageously has a plurality of throughflow openings, thus resulting in the possibility of further increased variability of the flow setting in particular by the formation of openings of differing size.

In particular, if a throughflow opening corresponds to a flow cross section of the sub-duct, there is the possibility of reducing flow losses, in particular caused by swirling, as a result of which a more effective incoming flow can be brought about.

In a further refinement, the flow-directing element is movable with the aid of an actuator. The actuator can be formed in the housing or outside the housing. In order to reduce the need for construction space, the actuator is preferably designed in the form of a stepping motor which is arranged coaxially with the flow-directing element and is rotationally fixed thereto.

In order to reduce production costs and in order to reduce the weight, the housing and/or the flow-directing element are/is produced from a plastic.

FIG. 1 illustrates a ventilating duct 1 according to an embodiment of the invention of a ventilation device 2 for a motor vehicle in a perspective view. The ventilating duct 1 has a housing 3 which comprises a first housing portion 4 and a second housing portion 5. The first housing portion 4 is designed facing away from an interior of the motor vehicle, also known as a passenger cell. Said first housing portion is therefore arranged facing an air conditioning unit. That is to say, it serves as a pickup for an incoming flow element arranged, for example, in a dashboard.

The second housing portion 5 is positioned facing the passenger cell. That is to say, in other words, the air mass flow emerging from the second housing portion 5, also called airflow, is conditioned with respect to its mass flow and its direction. Downstream of the second housing portion 5 and upstream of the interior, a directing element is preferably provided, said directing element being able to condition the air mass flow with regard to what is referred to as a Coanda effect.

The ventilating duct 1 comprises a main duct 6 which is divided in the second housing portion 5 downstream of the first housing portion 4 into four sub-ducts 8 with the aid of four partitions 7. This means, in other words, that the airflow is divisible into four partial flows. The flow direction of the airflow and of the partial flows is illustrated with the aid of the flow arrows 9. Each partition 7 is formed at an angle γ of 90° relative to the flow-directing element 10; 11. That is to say, in other words, that the partition 7 in its direction of extent along a longitudinal axis 12 of the ventilating duct 1 is formed transversely relative to the flow-directing element 10; 11.

That is furthermore to say, in other words, that a vertical flow-directing device is designed in the form of the flow-directing element 10; 11, and a flow-directing device which is horizontal thereto is designed in the form of the partitions 7.

Figure 2:
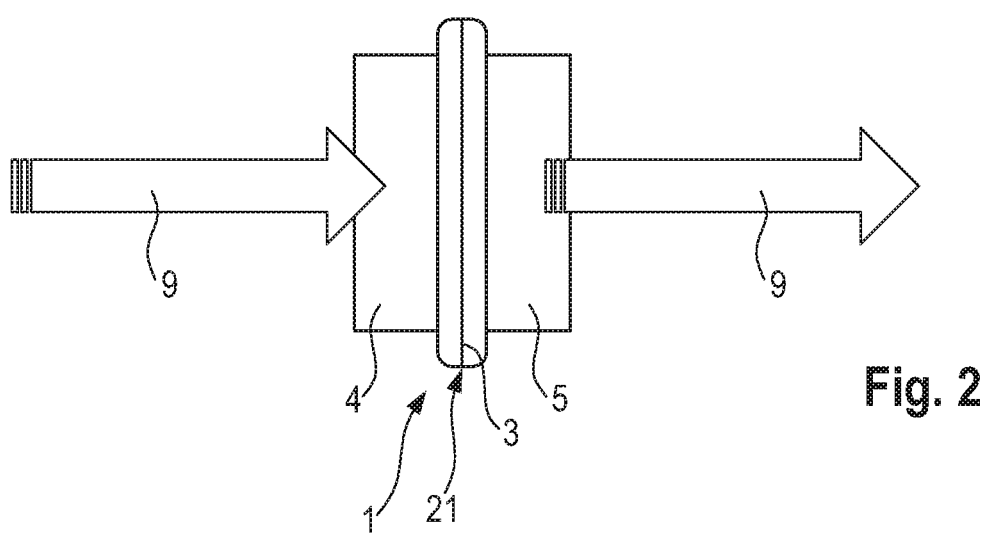
FIG. 2 shows, in a side view, the ventilating duct according to FIG. 1.

FIG. 2 illustrates the ventilating duct 1 in a side view. FIGS. 3 and 4 illustrate the ventilating duct 1 in a top view from the direction of the interior or in the direction of the interior.

The ventilating duct 1 according to the embodiment of the invention has two flow-directing elements, a first flow-directing element 10 and a second flow-directing element 11, in the form of perforated disks, wherein the first flow-directing element 10 in the first housing portion 4 and the second flow-directing element 11 in the second housing portion 5 are accommodated rotatably about a longitudinal axis 12 of the ventilating duct 1, as is illustrated in particular in FIG. 5.

In order to bring about rotation of the flow-directing elements 10, 11, each flow-directing element 10; 11 is assigned an actuator 13; 14, a first actuator 13 is assigned to the first flow-directing element 10 and a second actuator 14 to the second flow-directing element 11, wherein the actuators 13, 14 in this exemplary embodiment are designed in the form of a stepping motor. The actuators 13, 14 could also be realized in a different, correspondingly suitable form.

The two flow-directing elements 10, 11 are arranged directly adjacent, coaxially with the longitudinal axis 12 of the ventilating duct 1. This means that the longitudinal axis 12 corresponds to an axis of rotation of the flow-directing elements 10, 11. The actuator 13, 14 assigned to the flow-directing elements 10, 11 is arranged coaxially with respect to the axis of rotation thereof.

The flow-directing elements 10, 11 have a certain pattern of holes. The first flow-directing element 10 is illustrated by way of example in FIG. 6. The flow-directing elements 10, 11 are formed in the shape of disks, having a multiplicity of throughflow openings 15. The flow-directing elements 10, 11 illustrated in this exemplary embodiment are formed identically. The patterns of holes can be selected in such a manner that, upon a relative rotation of the two flow-directing elements 10, 11, a desired flow through the second housing portion 5 can be brought about.

The throughflow openings 15 have different sizes. That is to say, in other words, their cross section through which the flow can pass is designed to differ in size. The flow-directing elements 10, 11 have a largest throughflow opening 16 which virtually corresponds to a flow cross section 17 of the sub-duct 8. The cross section of the largest throughflow opening 16 through which the flow can pass preferably corresponds to the flow cross section 17 of the sub-duct 8.

The throughflow openings 15 are designed in the form of circular segments which are limited in their radial extent with the aid of an annular disk frame 18 of the flow-directing element 10; 11, which is of circular design in this exemplary embodiment. The throughflow openings 15 are separated from one another in the circumferential direction with the aid of webs 19 which extend between the disk frame 18 and a disk hub 20.

The circular design of the flow-directing elements 10, 11 and a circular duct cross section of the ventilating duct 1 have proven advantageous on account of reduced flow losses of the flow in the circular duct cross section and a symmetrical rotational movement leading around a centerpoint 21 of the flow-directing elements 10, 11.

The pattern of holes of the flow-directing elements 10, 11 is not necessarily limited to the pattern of holes illustrated by way of example, but may be formed differing therefrom. The two flow-directing elements 10, 11 likewise do not absolutely have to have an identical pattern of holes. This should depend on the flow conditions to be achieved in the interior.

Figure 7:
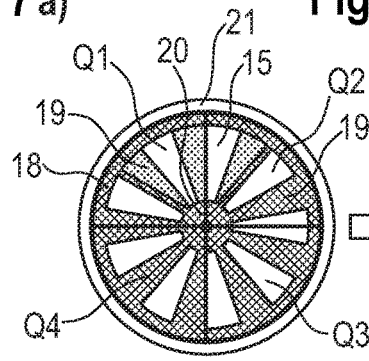
FIGS. 7a)-7f) show, in a top view, the ventilating duct according to FIG. 1 with different positionings of the flow-directing elements.
Figure 7:
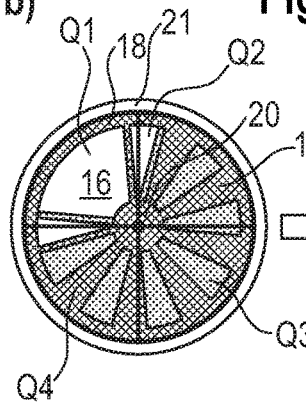
Figure 7:
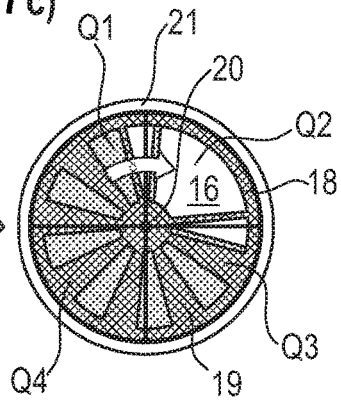
Figure 7:
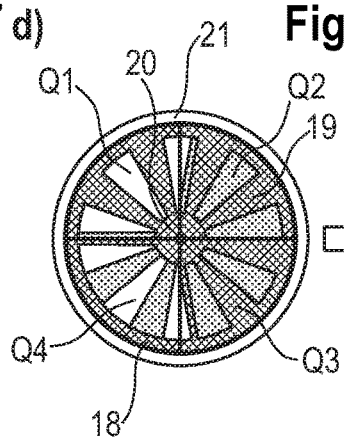
Figure 7:
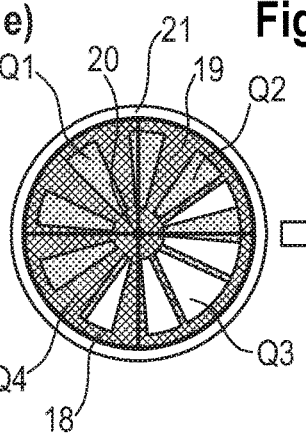
Figure 7:
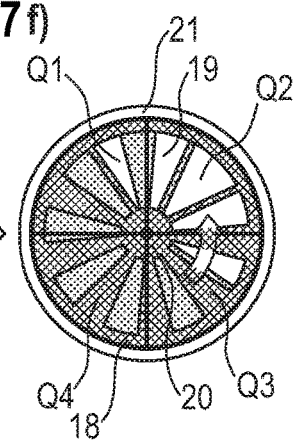

FIGS. 7*a*) to *f*) and 8*a*) to *c*) illustrate the two flow-directing elements 10, 11 in different positions. The flow-directing elements 10, 11 can rotate in opposed directions or in the same direction. For the improved explanation below, the sub-ducts 8 are referred to differently. The sub-duct 8 arranged top left is referred to below as first quadrant Q1, the sub-duct 8 formed adjacent thereto in the clockwise direction is referred to as second quadrant Q2, the sub-duct 8 formed adjacent thereto in the clockwise direction is referred to as third quadrant Q3 and the sub-duct 8 formed between the first quadrant Q1 and the third quadrant Q3 is referred to as fourth quadrant Q4.

FIG. 7*a*) illustrates the ventilating duct 1 in a neutral position of the two flow-directing elements 10, 11. This means, in other words, that the flow-directing elements 10, 11 are arranged with respect to each other in such a manner that identical resulting cross sections through which the flow can pass are opened up. According to the illustrated pattern of holes of the flow-directing elements 10, 11, starting from a congruent position, the two flow-directing elements 10, 11 are arranged rotated by 180° with respect to each other. The flow passes virtually uniformly through all four sub-ducts 8, or all of the quadrants Q1, Q2, Q3, Q4.

FIG. 7*b*) illustrates a rotation of the flow-directing elements 10, 11 with respect to each other, wherein the flow can predominantly pass through the first quadrant Q1. A joint rotation of the two flow-directing elements 10, 11 in the clockwise direction from the position illustrated in FIG. 7*b*) results in the position which is illustrated in FIG. 7*c*) and in which the flow can predominantly pass through the second quadrant Q2.

An adjustment of the two flow-directing elements 10, 11 at different speeds of rotation leads to that position of the ventilating duct 1 which is illustrated in FIG. 7*d*), wherein the flow can predominantly pass through the first quadrant Q1 and the fourth quadrant Q4.

In FIG. 7*e*), the two flow-directing elements 10, 11 are positioned with the aid of different speeds of rotation with respect to each other in such a manner that the flow can predominantly pass through the third quadrant Q3. Starting from this position, upon a common revolution of the two flow-directing elements 10, 11 counterclockwise, that position of the ventilating duct 1 which is illustrated in FIG. 7*o* is obtained. The second quadrant Q2 is predominantly opened up here, wherein the flow can partially pass through the first quadrant Q1 and the third quadrant Q3.

Figure 8:
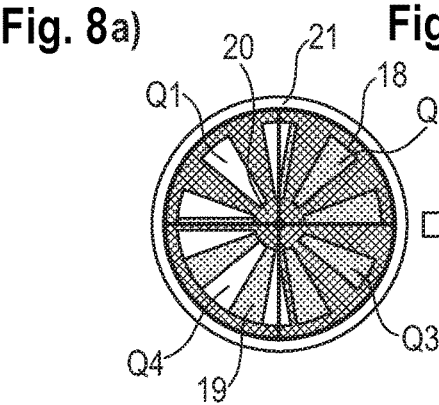
FIGS. 8a)-8c) show, in a top view, the ventilating duct according to FIG. 1 with exemplary relative positionings of the flow-directing elements with respect to one another during a change of an airflow from a left region of the ventilating duct into a right region of the ventilating duct.
Figure 8:
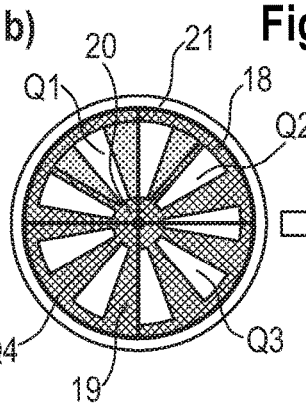
Figure 8:
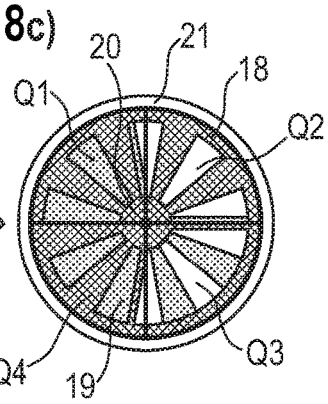

FIGS. 8*a*) to *c*) illustrate by way of example the rotation of the two flow-directing elements 10, 11 with respect to each other via the neutral position, as illustrated in FIG. 8*b*). Starting from the flow through the first quadrant Q1 and through the fourth quadrant Q4, the rotation via the neutral position is realized in such a manner that, after the end of the rotation, the flow passes through the second quadrant Q2 and the third quadrant Q3.

This means that, in the region of the second housing portion 5, it is not absolutely necessary for the airflow to pass through the entire main duct 6, but rather there is the possibility of blocking at least three of the four sub-ducts 8, or three of the four quadrants Q1 to Q4, and therefore the airflow flowing through the correspondingly opened up sub-duct 8 or quadrants Q1; Q2; Q3; Q4 is correspondingly conditioned. That is to say, in other words, that, downstream of the flow-directing elements 10, 11, the flow can pass differently through the main duct 6, divided into the quadrants Q1, Q2, Q3, Q4.

This is particularly helpful in the case of a flow-directing device which is provided downstream of the second housing portion 5 and brings about what is referred to as the Coanda effect. This Coanda effect corresponds to a continuation of the flow in accordance with the inertia thereof. That is to say, in other words, the flow obtains a certain direction impressed with the aid of the flow-directing device, the flow, in accordance with the inertia thereof, pursuing this direction downstream of said flow-directing device in a wall-free space.

At their ends formed facing each other, the housing portions 4, 5 each have a flange 21 which is designed so as to be able to accommodate the flow-directing elements 10, 11. The advantage is axial limiting of the flow-directing element 10; 11 during the installation. A further advantage is the accommodating of the disk frame 18 in the flange 21 in such a manner that the flow can pass through the cross section 17 without a flow obstruction, which the disk frame 18 would constitute, as a result of which a reduction of swirling can be brought about.

The ventilating duct 1 according to the embodiment of the invention can be designed as a compact arrangement with neutral geometry at an air pickup of the air conditioning unit and can be, for example, flange-mounted on the latter. It can preferably be fitted in the form of a blowmolded part, which is produced from plastic, into, for example, the dashboard.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ventilating duct for a ventilation device of a motor vehicle, comprising: a housing including a first housing portion and a second housing portion, the housing providing a main duct that extends, in a longitudinal direction, through the first housing portion and the second housing portion and that defines a flow cross-section, the first housing portion being configured to receive an air flow from an air conditioning system, and the second housing portion being configured to face a passenger cell of the motor vehicle and provide the air flow to the passenger cell; a disk configured to rotate about an axis of rotation that extends in the longitudinal direction and to direct an air flow from the first housing portion to the second housing portion; and a partition disposed in the second housing portion and arranged downstream of the disk, the partition dividing the main duct into at least two sub-ducts in the second housing portion, wherein the first housing portion and the second housing portion each includes a flange, and wherein the partition in its direction of extent along a longitudinal axis of the ventilating duct is formed transversely relative to the disk, wherein the flange of the first housing portion is connected to the flange of the second housing portion so as to form a widened region of the housing, wherein the disk is accommodated in the widened region of the housing.

2. The ventilating duct as claimed in claim 1, wherein the partition is formed at an angle ($\gamma$) of 90° relative to the disk.

3. The ventilating duct as claimed in claim 1, wherein the partition defines four sub-ducts.

4. The ventilating duct as claimed in claim 1, wherein the sub-ducts are formed symmetrically.

5. The ventilating duct as claimed in claim 1, wherein a further disk is accommodated coaxially with the disk in the housing.

6. The ventilating duct as claimed in claim 5, wherein the disk and the further disk are movable independently of each other.

7. The ventilating duct as claimed in claim 5, wherein the further disk is positioned directly adjacent to the disk.

8. The ventilating duct as claimed in claim 5, wherein the disk has a plurality of throughflow openings.

9. The ventilating duct as claimed in claim 8, wherein the plurality of throughflow openings have openings of differing size.

10. The ventilating duct as claimed in claim 8, wherein a largest throughflow opening has an opening corresponding to a flow cross section of the sub-duct.

11. The ventilating duct as claimed in claim 1, wherein the disk is movable with the aid of an actuator.

12. The ventilating duct as claimed in claim 11, wherein the actuator is a stepping motor.

13. The ventilating duct as claimed in claim 11, wherein the actuator is arranged coaxially with the disk.

14. The ventilating duct as claimed in claim 1, wherein the housing and/or the disk are/is produced from a plastic.

15. The ventilating duct as claimed in claim 5, wherein the disk extends in a plane perpendicular to the longitudinal direction, wherein the flow cross section is defined in a direction parallel to the plane, wherein an extent of the disk in the plane is larger than the flow cross section, and wherein an extent of the disk in the plane is larger than an extent of the housing outside of the widened region.

16. The ventilating duct as claimed in claim 1, further comprising a further disk configured to rotate about the axis of rotation that extends in the longitudinal direction and to direct the air flow from the first housing portion to the second housing portion, wherein the further disk is accommodated in the widened region of the housing.

17. The ventilating duct as claimed in claim 16, wherein the disk has a plurality of throughflow openings separated by a plurality of blocking portions, wherein the further disk has a plurality of second throughflow openings separated by a plurality of second blocking portions, and wherein the disk and the further disk are configured to be rotated independently of one another.

18. The ventilating duct as claimed in claim 17, further comprising: an actuator configured to rotate the disk independently of the further disk; and a second actuator configured to rotate the further disk independently of the disk.

19. The ventilating duct as claimed in claim 18, wherein the actuator is accommodated in the first housing portion and the second actuator is accommodated in the second housing portion.

* * * * *